March 1, 1955
C. J. KEIM ET AL
2,703,161
DRAWWORKS HAVING DUAL PURPOSE LOW DRIVE SHAFT
Filed May 15, 1953
6 Sheets-Sheet 1
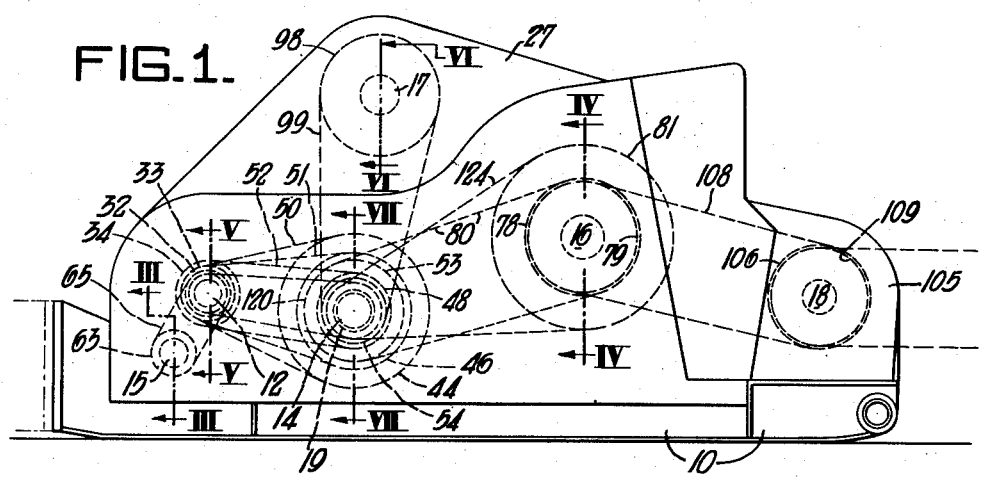
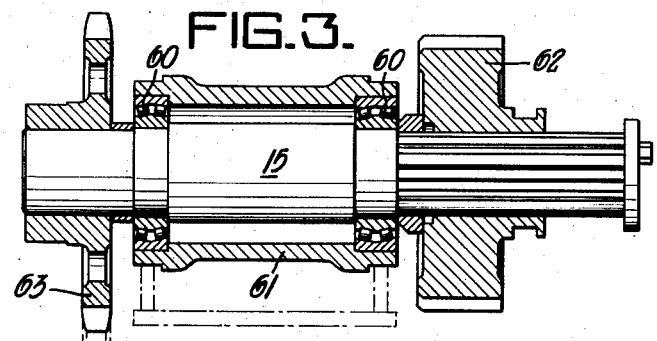
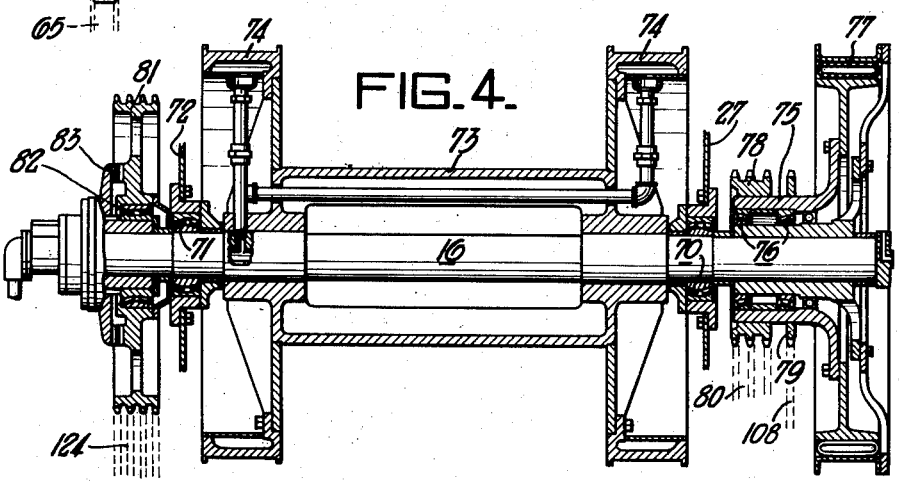
Inventors:
CHARLES J. KEIM and
MICHAEL L. RIZZONE,
by: Donald G. Dalton
their Attorney.

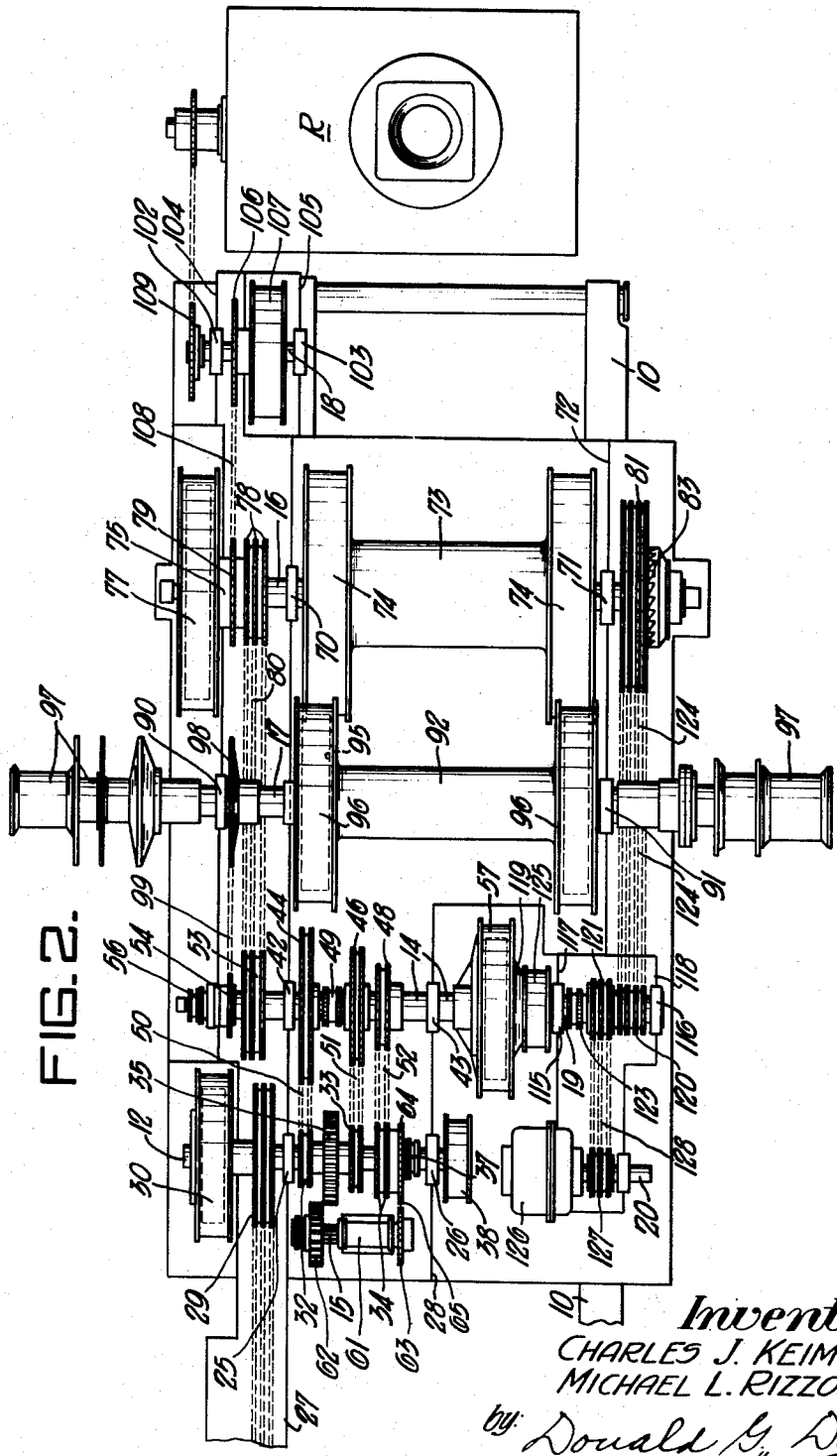

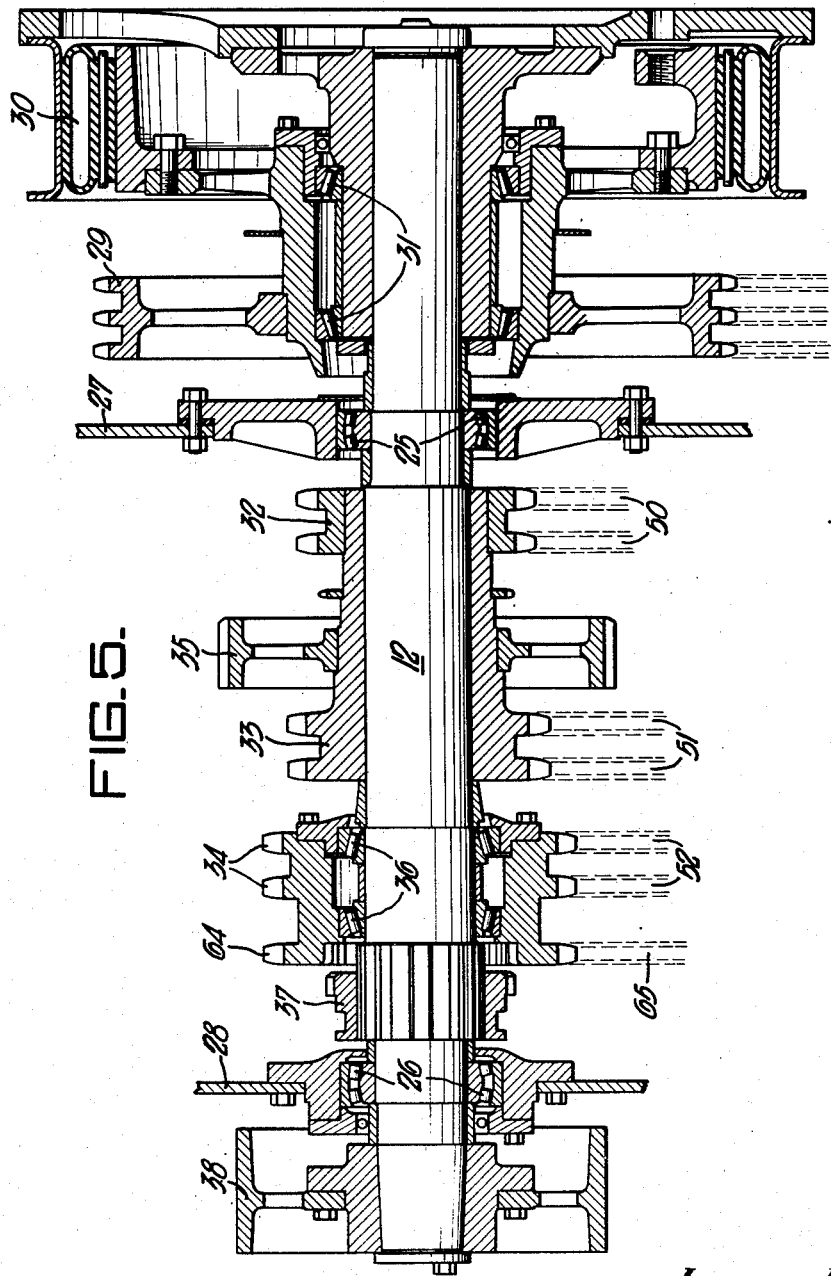

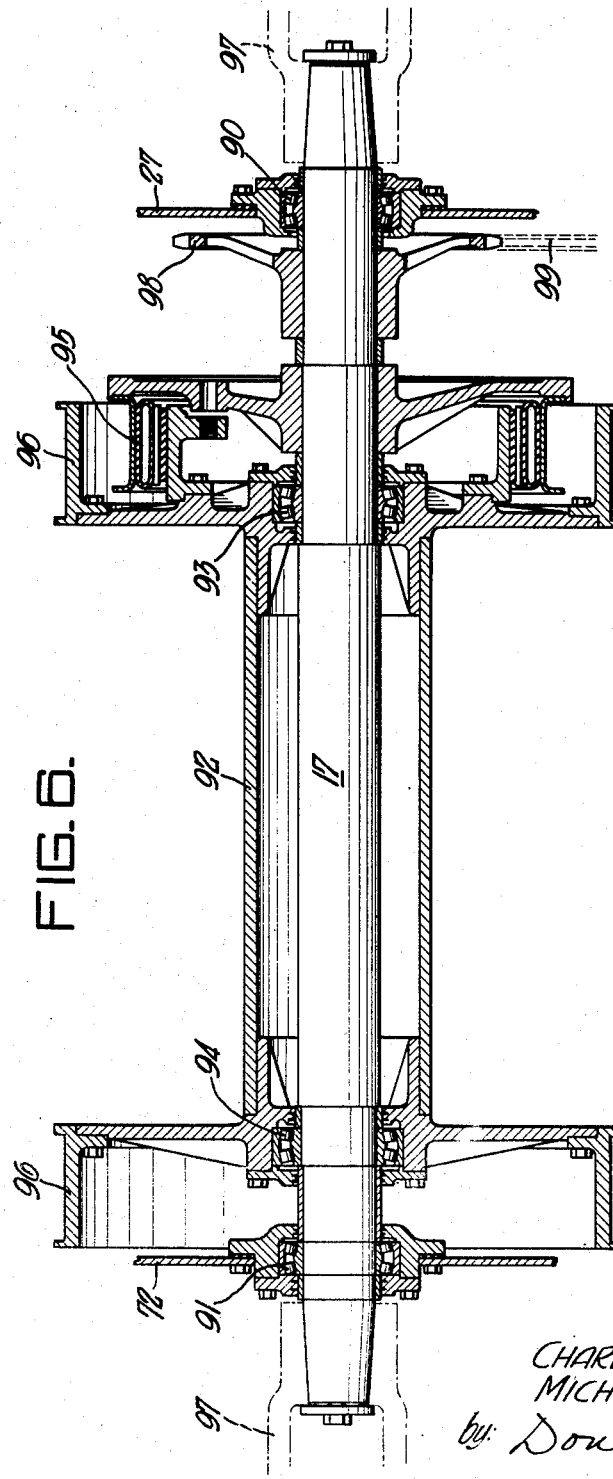

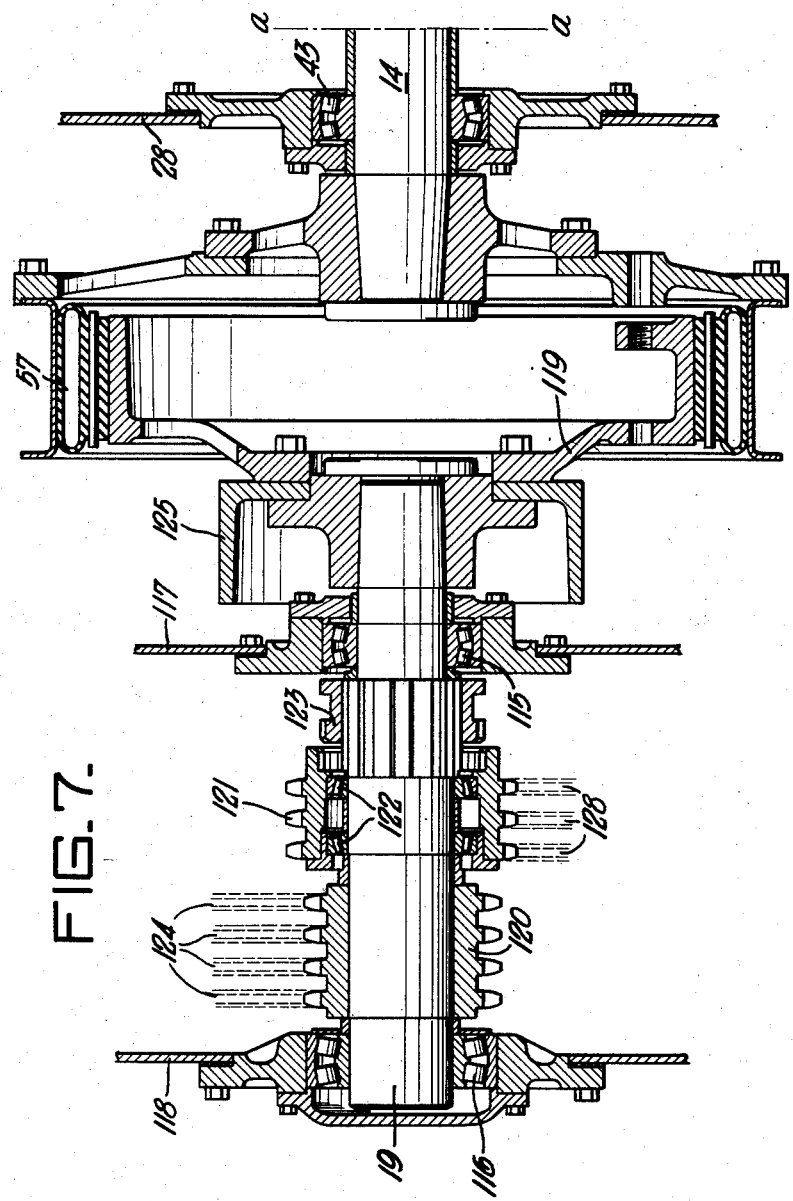

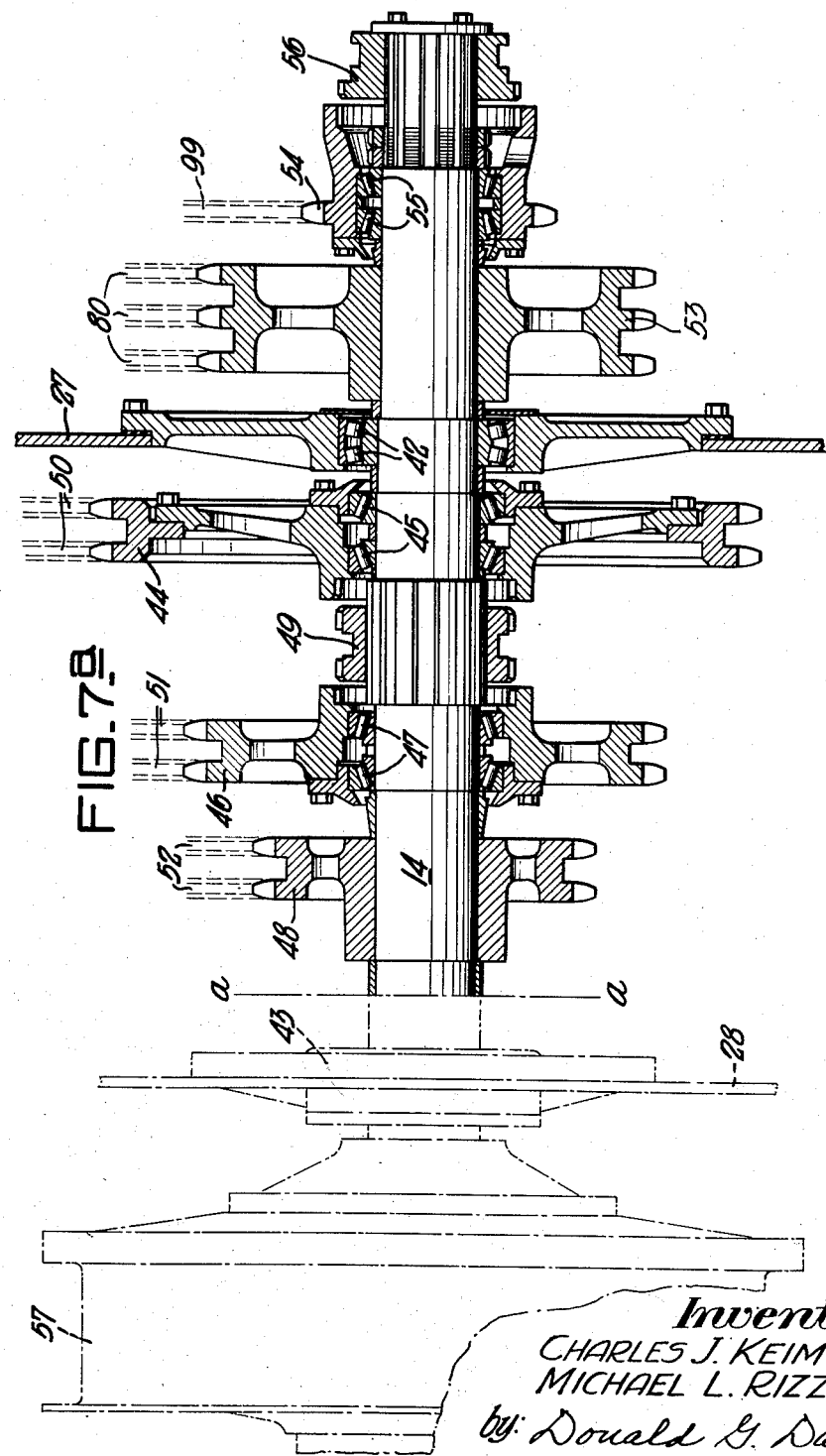

United States Patent Office 2,703,161
Patented Mar. 1, 1955

2,703,161

DRAWWORKS HAVING DUAL PURPOSE LOW DRIVE SHAFT

Charles J. Keim, Oil City, Pa., and Michael L. Rizzone, Houston, Tex., assignors to United States Steel Corporation, a corporation of New Jersey Application May 15, 1953, Serial No. 355,258

9 Claims. (Cl. 192—4)

This invention relates to improvements in drawworks for use in well drilling.

An object of the invention is to provide an improved drawworks which is more compact structurally and more flexible in its operation than those of previous constructions.

A further object is to provide a drawworks that can be converted readily from the usual six speed type to a three speed type without rearranging the transmission or the engine compounding means.

A further object is to provide a drawworks in which one of the forward speed sprockets on the input shaft serves also to transmit power to the output shaft when the latter is driven in reverse, thereby conserving space and reducing the number of parts required, as well as eliminating the need for large size reversing gears.

A further object is to provide a drawworks which has a hydraulic brake driven through the same shaft, sprocket and chain as those used for a special low drive.

In accomplishing these and other objects of our invention, we have provided improved details of structure, a preferred form of which is shown in the accompanying drawings in which:

Figure 1 is a side elevational view of a drawworks which embodies features of the present invention;

Figure 2 is a schematic top plan view showing the arrangement of shafts, sprockets and clutches;

Figure 3 is a vertical sectional view taken on line III—III of Figure 1 showing the reverse countershaft;

Figure 4 is a vertical sectional view taken on line IV—IV of Figure 1 showing the drum shaft;

Figure 5 is a vertical sectional view taken on line V—V of Figure 1 showing the input shaft;

Figure 6 is a vertical sectional view taken on line VI—VI of Figure 1 showing the cathead and sand reel shaft;

Figure 7 is a vertical sectional view taken on line VII—VII of Figure 1 showing the low drive shaft; and Figure 7a is a vertical sectional view also taken on line VII—VII of Figure 1 and forming a continuation of Figure 7 showing the output shaft.

The drawworks of our invention includes a supporting skid 10 and a plurality of vertical frame members upstanding therefrom and hereinafter enumerated. These frame members carry bearings for the various rotatable elements, among which are an input shaft 12, an output shaft 14, a reverse countershaft 15, a drum shaft 16, a cathead and sand reel shaft 17, a rotary countershaft 18, a low drive shaft 19 and a hydraulic brake shaft 20, all rotatable on horizontal axes parallel to each other.

The input shaft 12, shown in detail in Figure 5, is located adjacent one end of the skid 10 and is mounted in bearings 25 and 26 which are carried by a pair of frame members 27 and 28 located respectively adjacent one side edge of the skid 10 and intermediate the width of said skid. The input shaft thus extends approximately half the width of the skid. The input shaft has a portion which projects outwardly of the outside frame member 27 and carries a sprocket 29 and a clutch 30 preferably of the inflatable type. This sprocket is freely rotatable on the input shaft on bearings 31, but when the clutch 30 is engaged, a driving connection is established between the sprocket and input shaft. The sprocket 29 is connected to any suitable drive means not shown, for driving the drawworks. The central portion of the input shaft carries a low speed sprocket 32, an intermediate speed sprocket 33, a combination high speed and reverse sprocket 34 and a reverse gear 35, all located between the two frame members 27 and 28. The low and intermediate speed sprockets 32 and 33 and the reverse gear 35 are keyed to the shaft to rotate therewith, but the high speed and reverse sprocket 34 is freely rotatable with respect to the shaft on bearings 36. The shaft also carries a spline clutch 37 for establishing a driving connection with the sprocket 34. A portion of the input shaft projects beyond the intermediate frame member and carries a neutral brake drum 38.

The output shaft 14, shown in detail in Figure 7a, is located inwardly of the input shaft 12 and is rotatably mounted in bearings 42 and 43 carried by the same frame members 27 and 28. Thus the output shaft also extends approximately half the width of the skid. The central portion of this shaft carries a low speed sprocket 44 rotatably mounted on bearings 45, an intermediate speed sprocket 46 rotatably mounted on bearings 47, and a combination high speed and reverse sprocket 48 keyed thereto, all located between the two frame members 27 and 28. A spline clutch 49 is slidably mounted on the shaft between the sprockets 44 and 46 and can be shifted into engagement with either of them to establish a driving connection. The low speed sprocket 44, intermediate speed sprocket 46 and combination sprocket 48 on the output shaft 14 are aligned with the corresponding sprockets 32, 33 and 34 on the input shaft 12 and are connected therewith through multiple chains 50, 51 and 52 respectively. The output shaft 14 has a portion that extends outwardly of the outside frame member 27 and carries a sprocket 53 keyed thereto for driving the drum shaft 16 and rotary countershaft 18, a sprocket 54 rotatably mounted on bearings 55 for driving the cathead and sand reel shaft 17, and a spline clutch 56 for establishing a driving connection with the sprocket 54. The output shaft 14 also has a portion that extends beyond the intermediate frame member 28 and removably carries an inflatable clutch element 57 used in establishing a connection with the low drive shaft 19, as hereinafter explained.

The reverse countershaft 15, shown in detail in Figure 3, is located outwardly of and below the input shaft 12 and is rotatably mounted in bearings 60 carried by a housing 61 which is fixed to the skid 10 approximately midway between the frame members 27 and 28. A gear 62 has a spline connection with one end portion of this shaft. This gear is slidable along the shaft and has a position in which it engages the reverse gear 35 on the input shaft 12 for driving the reverse countershaft in the opposite direction of rotation from the input shaft. For forward operation the gear 62 is shifted to a position where it is free of the gear 35. The opposite end portion of the reverse countershaft carries a sprocket 63. The combination high speed and reverse sprocket 34 on the input shaft 12 (Figure 5) has a set of sprocket teeth 64 which are aligned with the sprocket 63 on the reverse countershaft and connected thereto through a chain 65. It is seen that this reversing mechanism has the further advantage of avoiding large size costly gearing between the input and output shafts.

The drum shaft 16, shown in detail in Figure 4, is rotatably mounted in bearings 70 and 71 carried by the outside frame member 27 and another outside frame member 72 adjacent the opposite side of the skid 10. The central portion of the drum shaft between the two frame members carries a hoist drum 73 of any standard or desired construction. The ends of the hoist drum have brake drums 74, which preferably are water cooled. The drum shaft has a portion that projects outwardly of the frame member 27 and carries a sprocket sleeve 75 rotatably mounted thereon on bearings 76, and a clutch 77, preferably of the inflatable type, for establishing a driving connection between the sleeve and shaft. The sleeve 75 has a sprocket 78, which is aligned with the sprocket 53 on the output shaft 14, and a second sprocket 79 for driving the rotary countershaft 18, as hereinafter described. The sprockets 53 and 78 are drivingly connected through multiple chains 80. The drum shaft 16 also has a portion that extends outwardly of the frame member 72 on the opposite side and carries a sprocket 81 rotatably mounted on bearings 82 and a jaw clutch 83 for establishing a driving connection between the shaft and the latter sprocket. This last named sprocket is connected with the low drive shaft 19, as hereinafter explained.

The cathead and sand reel shaft 17, shown in detail in Figure 6, is rotatably mounted in bearings 90 and 91 carried by the outside frame members 27 and 72 and is located approximately above the output shaft 14. To clarify the sprocket arrangement, Figure 2 shows the shafts 16 and 17 somewhat spread out from their actual locations, which are shown in Figure 1. The central portion of the shaft 17 carries a sand reel 92 rotatably mounted on bearings 93 and 94 and a clutch 95, preferably of the inflatable type, for establishing a driving connection with the sand reel. The ends of the sand reel carry brake drums 96. Catheads 97 are keyed to the end portions of the shaft 17 outside the frame members 27 and 72. A sprocket 98 is keyed to this shaft and is aligned with the sprocket 54 on the output shaft 14 and connected thereto through a chain 99.

The rotary countershaft 18, shown only in Figures 1 and 2, is rotatably mounted in bearings 102 and 103 which are carried in a pair of frame members 104 and 105 upstanding from the skid 10 adjacent the end opposite the input shaft 12. The shaft 18 carries a sprocket 106 rotatably mounted thereon and a clutch 107, preferably of the inflatable type, for establishing a driving connection between the sprocket and shaft. The sprocket 106 is aligned with the sprocket 79 on the sleeve 75 of the drum shaft 16 and is connected thereto through a chain 108. The shaft 18 also carries a sprocket 109 for driving a rotary indicated at R (Figure 2).

The low drive shaft 19, shown in detail in Figure 7, is axially aligned with the output shaft 14, and is rotatably mounted in bearings 115 and 116, which are carried in frame members 117 and 118. Preferably these last named frame members are fixed to a separate base which is removably fastened to the skid 10 so that the low drive shaft and its mounting can be removed as a unit from the skid. The inner end of this shaft carries a clutch element 119 which is cooperable with the inflatable clutch element 57 on the output shaft 14 for establishing a driving connection between the shafts 14 and 19. The central portion of the shaft 19 carries a sprocket 120 keyed thereto, a sprocket 121 rotatable thereon on bearings 122 and a spline clutch 123 for establishing a driving connection between the shaft and the latter sprocket. Sprocket 120 is aligned with the sprocket 81 on the drum shaft 16 and is connected thereto through multiple chains 124. Sprocket 121 is connected with the hydraulic brake shaft 20, as hereinafter explained. The low drive shaft also carries a brake drum 125 which forms part of an inertia brake.

The hydraulic brake shaft 20 is part of a hydraulic brake 126, which is an item of standard manufacture, and per se not part of the present invention. The hydraulic brake is formed as a unit and is removably fixed to the skid in the space between the end of the input shaft 12 and the side edge of the skid. Thus it is not necessary to extend the skid in any way to accommodate this brake. The brake shaft carries a sprocket 127 which is connected to the sprocket 121 on the low drive shaft 19 through multiple chains 128.

In operation, the input shaft 12 is driven through its sprocket 29 on inflation and consequent engagement of clutch 30. For driving the output shaft 14 in low speed, the spline clutch 49 on the output shaft is engaged with sprocket 44, whereby the input shaft drives the output shaft through sprockets 32 and 44 and chains 50. For driving in intermediate speed, this spline clutch is engaged with sprocket 46, whereby the input shaft drives the output shaft through sprockets 33 and 46 and chains 51. For driving in high speed, the spline clutch 49 stays in its neutral position, and the spline clutch 37 on the input shaft 12 is engaged with the combination high speed and reverse sprocket 34, whereby the input shaft drives the output shaft through sprockets 34 and 48 and chains 52. For driving the output shaft in reverse, the spline clutches 37 and 49 both are disengaged and the gear 62 on the reverse countershaft 15 is shifted into engagement with the reverse gear 35 on the input shaft 12. Now the output shaft is driven through the gears 35 and 62, the reverse countershaft 15, sprockets 63, 64, 34 and 48 and chains 65 and 52. Thus it is seen that the sprockets 34 and 48 and the chains 52 function either as a high speed drive means or a reverse drive means for the output shaft.

The output shaft 14 continuously drives the sleeve 75 on the drum shaft 16 through the sprockets 53 and 78 and chains 80. On inflation of clutch 77 and consequent engagement, the sleeve 75 drives the drum shaft and hoist drum 73. The sleeve 75 and sprocket 79 thereon continuously drive the sprocket 106 on the rotary countershaft 18 through the chain 108. On inflation of clutch 107 and consequent engagement, the sprocket 106 drives the rotary countershaft, which drives the rotary R through its sprocket 109.

The structure whose operation has been described thus far furnishes three forward speeds and one reverse speed for driving the hoist drum and rotary. The low drive shaft 19 furnishes three additional forward speeds and one additional reverse speed for driving the drum. The output shaft 14 drives the low drive shaft on inflation of the clutch element 57 on the former shaft and consequent engagement between this clutch element and the clutch element 119 on the latter shaft. Thereupon the sprocket 120 on shaft 19 and chains 124 drive the sprocket 81 on the drum shaft, which drives the hoist drum 73, provided that the jaw clutch 83 is first engaged. The speeds attainable for driving the hoist drum via the low drive shaft are lower than the corresponding speeds attainable by driving the drum directly through the sleeve 75.

When the drawworks is used in "going in the hole," i. e. lowering the drill string into a drill hole, it is necessary to apply a retarding force to the hoist drum. Part of this retarding force can be applied through the hydraulic brake 126 by engaging the jaw clutch 83 on the drum shaft 16 and the spline clutch 123 on the low drive shaft 19. The clutch elements 57 and 119 are of course disengaged. Thus the connection to the hydraulic brake is through sprockets 81, 120, 121 and 127 and chains 124 and 128. The low drive shaft 19 has the second function of transmitting a retarding force to the hoist drum. The action of the hydraulic brake is of course supplemental to that of the brake drums 74 on the hoist drum.

The cathead and sand reel shaft 17 is driven from the output shaft 14 on engagement of the spline clutch 56 on the output shaft with the sprocket 54. This sprocket transmits power to the shaft 17 via the chain 99 and sprocket 98 on the latter shaft. The catheads 97 rotate whenever the shaft rotates. The sand reel 92 is rotated on inflating the clutch 95.

As hereinbefore mentioned, the low drive shaft 19 and its mounting and the clutch element 57 on the output shaft 14 can be removed. The hydraulic brake 126 then can be moved into the space on the skid otherwise occupied by the low drive means, and its sprocket 127 can be connected directly to the sprocket 81 on the drum shaft 16. This alternative arrangement furnishes a simpler three speed drive, rather than a six speed drive. Preferably the parts are constructed so that the hydraulic brake can be attached to the skid in the same bolt holes as the low drive shaft assembly. Consequently the drawworks can be converted easily from one type to the other, and the same design of parts can be used for either type.

Our drawworks of course includes brake bands and operating mechanisms therefor cooperable with the brake drums 38, 74, 96 and 125, cooling means for the brake drums, clutch shifters cooperable with the various spline and jaw clutches, air conduits and valves for introducing compressed air to the various inflatable clutches, appropriate controls for these parts, lubricating means, and preferably an outside housing. None of these parts are involved in the present invention, and they can be of any standard or desired construction. Therefore in the interest of simplicity no showing is made. Other parts, such as the clutches and bearings per se, can likewise be of standard construction and in some instances are shown only diagrammatically.

From the foregoing description it is seen that our drawworks provides both a maximum of operating flexibility and physical compactness. The same parts perform dual functions wherever possible and the full space on the skid can be utilized. At the same time the drawworks is readily convertible between a six speed and a three speed type.

While we have shown and described certain preferred embodiments of the invention, it is apparent that modifications may arise. Therefore, we do not wish to be limited to the disclosure set forth but only by the scope of the appended claims.

We claim:

1. A drawworks comprising a frame, an input shaft, an output shaft and a drum shaft all rotatably mounted on said frame, a plurality of power transmitting devices interconnecting said input and output shafts to provide a plurality of forward speeds for driving said output shaft from said input shaft, a reverse countershaft rotatably mounted on said frame, gearing for drivingly connecting said input shaft and said reverse countershaft, and means connecting said reverse countershaft with one of said power transmitting devices enabling this same device to operate also for driving said output shaft in reverse from said input shaft, and power transmission means interconnecting said output shaft and said drum shaft.

2. A drawworks comprising a frame, an input shaft, an output shaft and a drum shaft all rotatably mounted on said frame, low speed, intermediate speed and high speed power transmitting devices interconnecting said input and output shafts to provide a plurality of forward speeds for driving said output shaft from said input shaft, a reverse countershaft rotatably mounted on said frame, gearing for drivingly connecting said input shaft and said reverse countershaft to rotate the reverse countershaft in the opposite direction from said drive shaft, power transmission means connecting said reverse countershaft with one of said power transmitting devices enabling this same power transmitting device to operate also for driving said output shaft in reverse from said input shaft, and power transmission means interconnecting said output shaft and said drum shaft.

3. A drawworks comprising a frame, an input shaft, an output shaft and a drum shaft all rotatably mounted on said frame, a sprocket rotatably mounted on said input shaft, a clutch for drivingly connecting said sprocket and said input shaft, a sprocket mounted on said output shaft to rotate therewith, a chain drivingly interconnecting said sprockets, said sprockets and chain being adapted to transmit power from said input to said output shaft to drive the latter in the forward direction on engagement of said clutch, a reverse countershaft rotatably mounted on said frame, gearing adapted when engaged to drive said reverse countershaft from said input shaft in the opposite direction, a sprocket on said reverse countershaft, said first named sprocket having an additional set of sprocket teeth, a chain drivingly interconnecting the sprocket on said reverse countershaft with said additional sprocket teeth to enable the same sprockets on the input and output shafts to transmit power to drive the output shaft in reverse, and power transmission means interconnecting said output shaft and said drum shaft.

4. A drawworks comprising a frame, an input shaft, an output shaft and a drum shaft all rotatably mounted on said frame, a plurality of power transmitting devices interconnecting said input and output shafts to provide a plurality of forward speeds for driving said output shaft from said input shaft, power transmission means interconnecting said output shaft and said drum shaft, a low drive shaft rotatably mounted on said frame and axially aligned with said output shaft, clutch means for coupling said low drive shaft to said output shaft, and power transmission means interconnecting said low drive shaft and said drum shaft to provide lower forward speeds for driving said drum shaft in addition to those obtainable through said first named power transmission means, said low drive shaft and its mounting being removable as a unit from said frame.

5. A drawworks comprising a frame, an input shaft, an output shaft and a drum shaft all rotatably mounted on said frame, a plurality of power transmitting devices interconnecting said input and output shafts to provide a plurality of forward speeds for driving said output shaft from said input shaft, power transmission means interconnecting said output shaft and said drum shaft, a low drive shaft rotatably mounted on said frame and axially aligned with said output shaft, clutch means for coupling said low drive shaft to said output shaft, power transmission means interconnecting said low drive shaft and said drum shaft to provide lower forward speeds for driving said drum shaft in addition to those obtainable through said first named power transmission means, a hydraulic brake mounted on said frame, and power transmission means interconnecting said low drive shaft and said hydraulic brake enabling said low drive shaft to operate also as a means for transmitting rotation of said drum shaft to said brake.

6. A drawworks as defined in claim 5 in which said input shaft extends approximately half the frame width and said hydraulic brake is located between the end of said input shaft and the side of said frame.

7. A drawworks as defined in claim 5 in which said low drive shaft and its mounting are removable as a unit from said frame, and said hydraulic brake can be inserted in the space otherwise occupied by said low drive shaft and connected to said drum shaft for converting the drawworks to one having a smaller number of forward speeds.

8. A drawworks as defined in claim 5 in which said input shaft and said output shaft each occupy approximately half the width of said frame, said hydraulic brake is located between the end of said input shaft and the side edge of said frame, and said low drive shaft and its mounting are located in the space between the end of said output shaft and the side edge of said frame and are removable therefrom as a unit.

9. A drawworks comprising a frame, an input shaft, an output shaft and a drum shaft all rotatably mounted on said frame, a plurality of power transmitting devices interconnecting said input and output shafts to provide a plurality of forward speeds for driving said output shaft from said input shaft, a low drive shaft rotatably mounted on said frame and axially aligned with said output shaft, clutch means for coupling said low drive shaft to said output shaft, a chain and sprocket mechanism connecting said output shaft and one end of said drum shaft, a second chain and sprocket mechanism connecting said low drive shaft and the other end of said drum shaft, a hydraulic brake mounted on said frame, and a chain and sprocket mechanism connecting said low drive shaft and said hydraulic brake enabling said low drive shaft to transmit either a motivating force to said drum shaft or rotation of said drum shaft to said brake.

References Cited in the file of this patent

UNITED STATES PATENTS

| | | |
|---|---|---|
| 1,979,780 | Turney | Nov. 6, 1934 |
| 2,344,681 | Deschner | Mar. 21, 1944 |
| 2,351,851 | Young | June 20, 1944 |
| 2,502,969 | Maier | Apr. 4, 1950 |
| 2,536,483 | Young | Jan. 2, 1951 |
| 2,650,064 | Picard | Aug. 25, 1953 |